(12) United States Patent
Janzen

(10) Patent No.: US 8,490,774 B2
(45) Date of Patent: Jul. 23, 2013

(54) LOADING STATION FOR TRANSPORT BAGS TRANSPORTED IN AN OVERHEAD CONVEYOR SYSTEM

(75) Inventor: Paul Janzen, Bielefeld (DE)

(73) Assignee: Dürkopp Fördertechnik GmbH, Bielefeld (DE)

( * ) Notice: Subject to any disclaimer, the term of this patent is extended or adjusted under 35 U.S.C. 154(b) by 203 days.

(21) Appl. No.: 13/034,273

(22) Filed: Feb. 24, 2011

(65) Prior Publication Data

US 2012/0216917 A1 Aug. 30, 2012

(51) Int. Cl.
*B65G 17/20* (2006.01)
*B65G 47/06* (2006.01)

(52) U.S. Cl.
USPC ........ 198/397.01; 198/384; 198/607; 53/249; 53/251; 53/384.1

(58) Field of Classification Search
USPC .................. 198/384, 397.01, 457.01, 457.05, 198/466.1, 473.1, 607, 678.1, 750.14, 797; 53/564, 570, 249, 250, 251, 384.1
See application file for complete search history.

(56) References Cited

U.S. PATENT DOCUMENTS

| 4,515,509 | A | * | 5/1985 | Frisz | 414/412 |
| 4,524,564 | A | * | 6/1985 | Groom et al. | 53/449 |
| 4,640,081 | A | * | 2/1987 | Kawaguchi et al. | 53/510 |
| 5,058,750 | A | * | 10/1991 | Gr se | 209/583 |
| 5,622,025 | A | * | 4/1997 | Kitagawa et al. | 53/53 |
| 5,664,659 | A | * | 9/1997 | Gaertner | 198/360 |
| 5,809,746 | A | * | 9/1998 | DePuy | 53/458 |
| 5,901,832 | A | * | 5/1999 | Woolley et al. | 198/626.3 |
| 6,267,224 | B1 | * | 7/2001 | Jones | 198/443 |
| 6,698,575 | B2 | | 3/2004 | Gartner | |
| 7,469,522 | B2 | * | 12/2008 | Dettwiller | 53/558 |
| 7,673,436 | B2 | * | 3/2010 | Bershadsky et al. | 53/251 |
| 7,877,966 | B2 | * | 2/2011 | Knoke et al. | 53/469 |
| 8,151,971 | B2 | * | 4/2012 | Baldanza et al. | 198/418.5 |

FOREIGN PATENT DOCUMENTS

| DE | 3206829 A1 | 9/1983 |
| DE | 10123598 A1 | 11/2002 |
| DE | 102004018569 A1 | 11/2005 |
| DE | 102005006067 A1 | 8/2006 |
| DE | 102008026720 A1 | 12/2009 |
| DE | 102008061685 A1 | 6/2010 |
| EP | 0517677 A2 | 12/1992 |
| EP | 1690811 A1 | 8/2006 |

OTHER PUBLICATIONS

Co-pending U.S. Appl. No. 13/177,159, entitled "Conveyor Installation Bags for Material to be Transported", filed Jul. 6, 2011.

* cited by examiner

*Primary Examiner* — Douglas Hess
(74) *Attorney, Agent, or Firm* — Browdy and Neimark, P.L.L.C.

(57) ABSTRACT

A loading station for transport bags transported in an overhead conveyor system comprises an upper supply rail for the transport bags, a vertical conveyor which adjoins the supply rail for moving the transport bags into a lower loading position, a device for opening the transport bags in the loading position and a lower discharge rail which adjoins the vertical conveyor for discharging the transport bags from the loading position.

16 Claims, 4 Drawing Sheets

LOADING STATION FOR TRANSPORT BAGS TRANSPORTED IN AN OVERHEAD CONVEYOR SYSTEM

BACKGROUND OF THE INVENTION

1. Field of the Invention

The invention relates to a loading station for transport bags transported in an overhead conveyor system.

2. Background Art

In order to be able to transport so-called flat goods such as shoes, packaged pieces of clothing and other packages in overhead conveyor systems, transport bags are used which as a rule comprise carrier hooks which are adapted to be inserted into corresponding retaining members of the overhead conveyor system such as hangers on which clothes are hanging.

Such overhead conveyor systems are known for example from EP 1 690 811 A1. In such overhead conveyor systems, retaining members are transported in rails by means of driven chains, the retaining members comprising lower lug-like retaining parts into which hangers are inserted. Such hangers are usually used to transport pieces of clothing but also the mentioned transport bags.

Furthermore, transport bags are known which consist of a flexible material such as a fabric in the form of a web, with an approximately rectangular frame-like hanger being provided in the upper region which accommodates both ends of the web of fabric. The bags, which are open laterally relative to the direction of conveyance, are adapted to receive and transport objects which cannot be hung up on hangers. These objects are so-called flat goods. As such transport bags can only by loaded from the side, a mechanical loading is not possible using the known means.

SUMMARY OF THE INVENTION

It is the object of the invention to provide a loading station for overhead conveyor systems which allows transport bags to be loaded with flat goods mechanically.

This object is achieved according to the invention by a loading station for transport bags transported in an overhead conveyor system, comprising an upper supply rail for the transport bags; a vertical conveyor which adjoins the upper supply rail for supplying the transport bags in a lower loading position; an opening device for opening the transport bags in the lower loading position; and a lower discharge rail which adjoins the vertical conveyor for moving the transport bags away from the lower loading position in a transport direction. As the transport bags are individually moved down from the actual overhead conveyor system into a loading position where they are opened at their upper end, loading from above is very easily possible, for example by means of a transport device for flat goods.

Further features, details and advantages of the invention will become apparent from the ensuing description of an embodiment by means of the drawing.

DESCRIPTION OF THE PREFERRED EMBODIMENT

Figure 1:
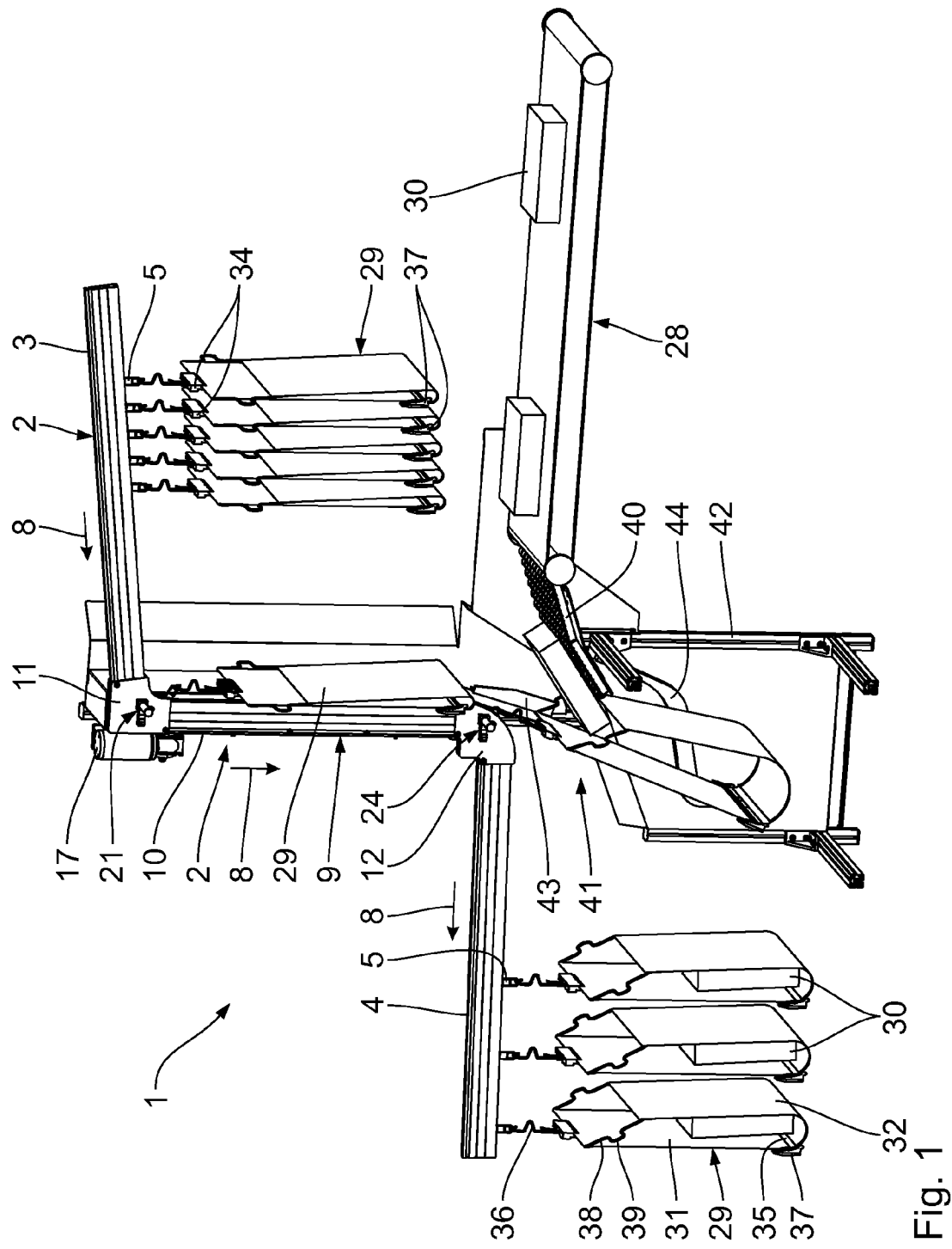
FIG. 1 shows a perspective view of an overhead conveyor system comprising a loading station according to the invention and transport bags.
Figure 2:
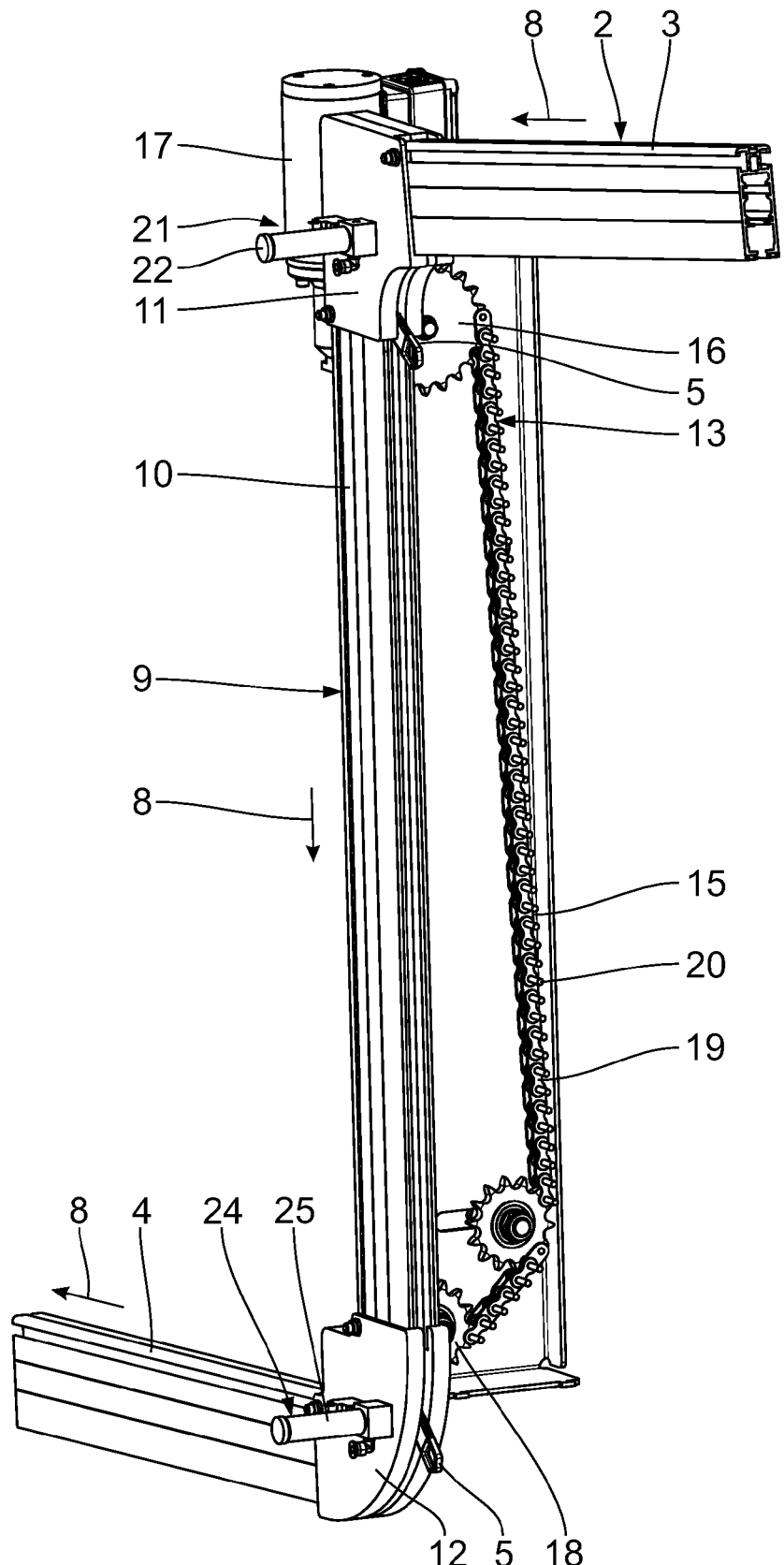
FIG. 2 shows a perspective view, which is enlarged compared to FIG. 1, of a vertical conveyor of the conveyor system shown in FIG. 1 without transport bags.
Figure 3:
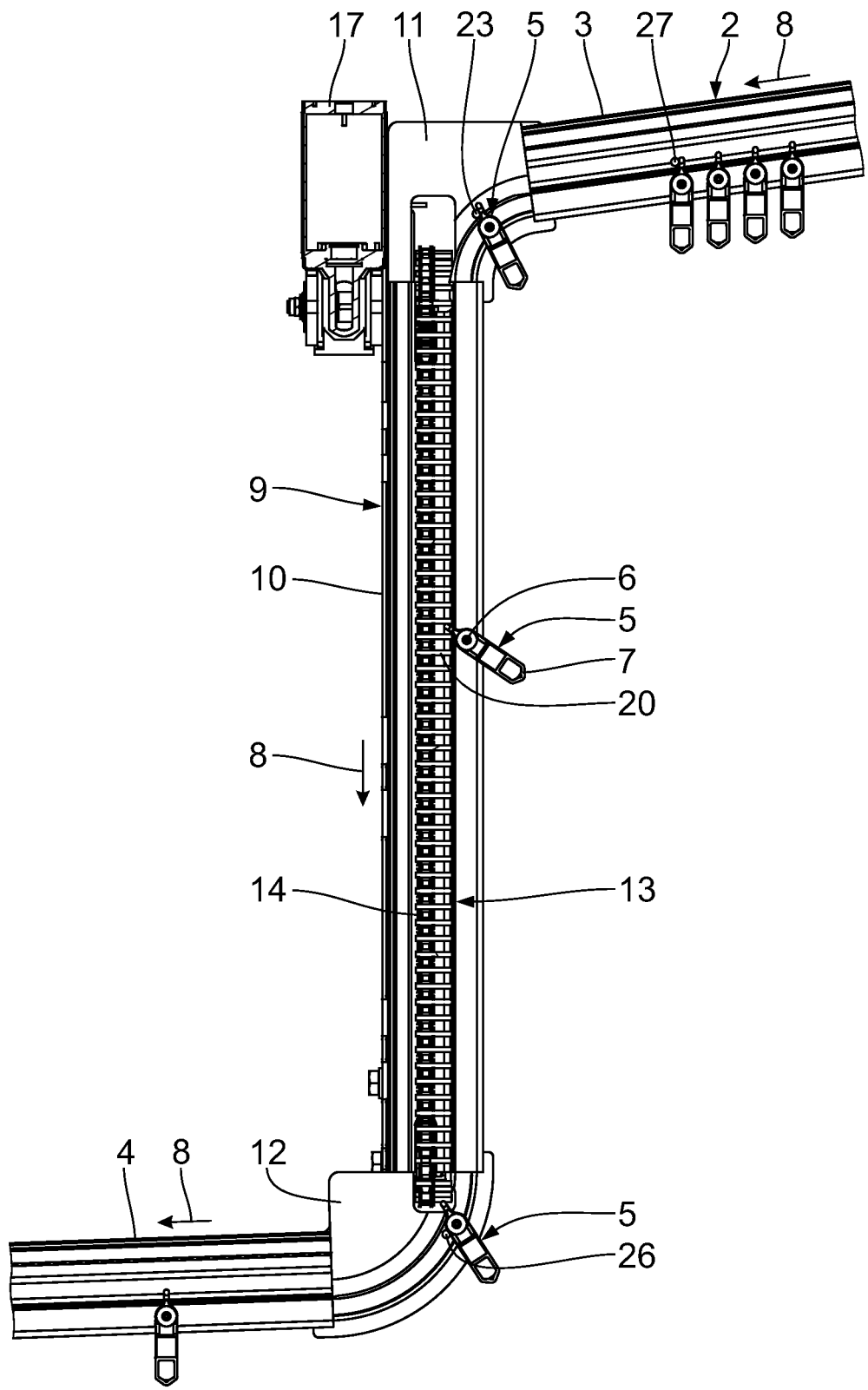
FIG. 3 is a broken-open view of the vertical conveyor according to FIG. 2 without transport bags.
Figure 4:
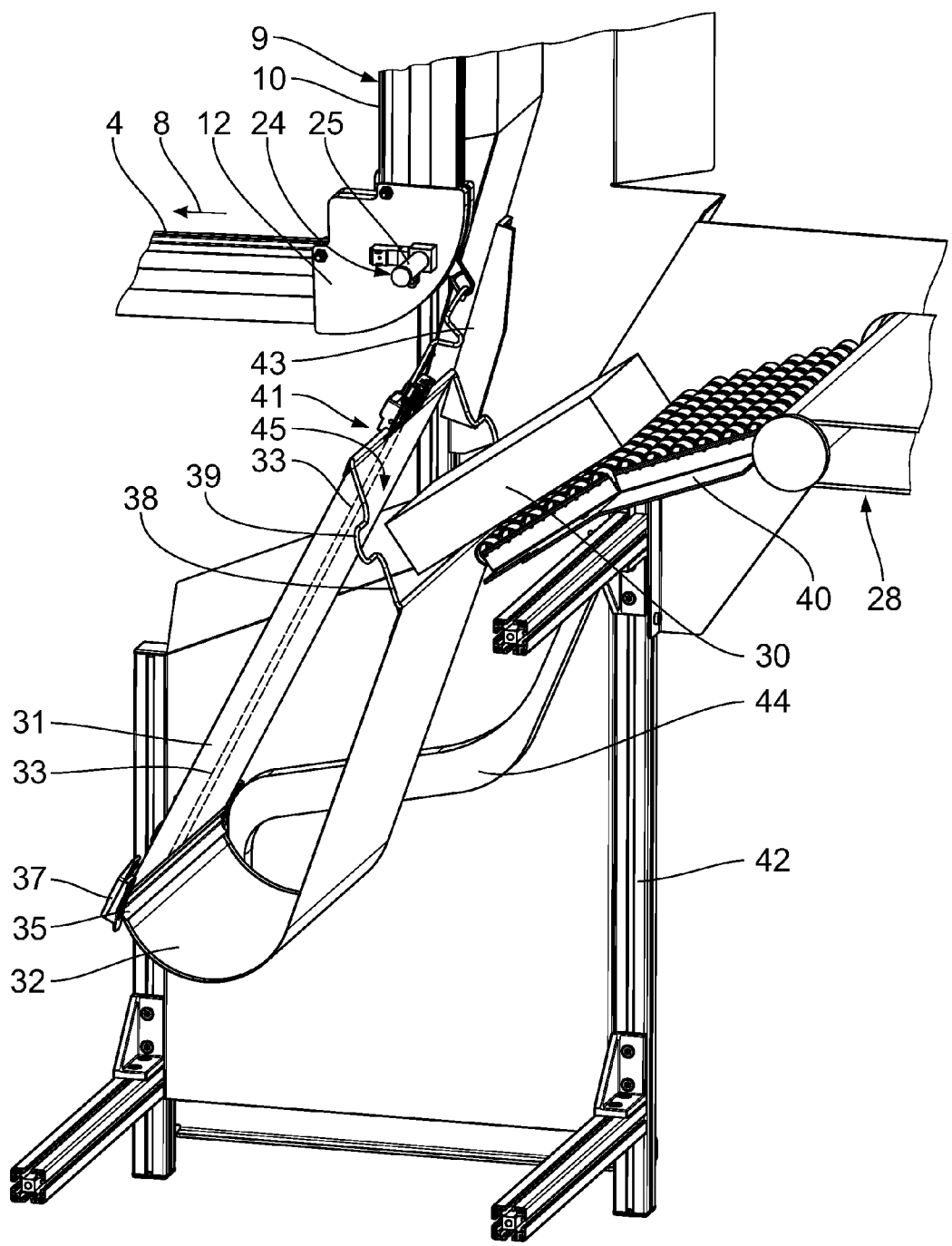
FIG. 4 is a partial view, which is enlarged compared to FIG. 1, of a loading position of the conveyor system.

The loading station 1 shown in FIG. 1 forms part of an overhead conveyor system 2 of which only a supply rail 3 leading into the loading station 1 and a discharge rail 4 leading out of the loading station 1 are shown. In the rails 3, 4 which are designed as hollow profiles, retaining members 5 are mounted by means of track rollers 6, the retaining members 5 comprising a lug-like retaining part 7 projecting downwards and out of the respective rail 3 or 4. Since both the supply rail 3 and the discharge rail 4 are installed in a sloping manner in the transport direction 8, no drive device is required for the retaining members 5 in the rails 3, 4 in the region of the loading station 1. The rails 3, 4, the retaining members 5 as well as corresponding drive devices for the retaining members 5 are also shown and described in EP 1 690 811 A1 to which reference can be made.

An essential component of the loading station 1 is a vertical conveyor 9. The essential aspect about the vertical conveyor 9 is that the direction of conveyance is substantially vertical, in other words from the top to the bottom, wherein said direction of conveyance does not have to be exactly vertical but only substantially vertical. The vertical conveyor 9 comprises a vertical transport rail 10 which has the same profile as the rails 3, 4. The supply rail 3 leads into the rail 10 from above via an upper supply deflection part 11. The lower end of the rail 10 is connected to the discharge rail 4 via a discharge deflection part 12. The vertical conveyor 9 furthermore comprises a transport chain 13; a transport strand 14 thereof, which runs in the transport direction, runs downwards in the rail 10 while the return strand 15, which runs upwards, is arranged outside the rail 10. The transport chain 13 is driven via a drive pinion 16 located at the upper supply deflection part 11, the drive pinion 16 being drivable by means of an electric motor 17. The lower discharge deflection part 12 is provided with a deflection pulley 18 for the chain 13. Each chain link 19 of the transport chain 13 is provided with a projecting entrainer bolt 20 so that when a retaining member 5 has reached the transport chain 13, it is transported downwards between two such bolts 20 at the speed of the transport chain 13.

The upper supply deflection part 11 is provided with a supply stopping device 21 which consists of a pneumatically actuable piston cylinder drive 22 which comprises a stop bolt 23 which is slidable into or removable from a path of a retaining member 5 in the supply deflection part 11. A corresponding loading stopping device 24 comprising a piston cylinder drive 25 and a stop bolt 26 is arranged at the lower discharge deflection part 12. A corresponding pre-stopping device in the form of a separation device is arranged at the supply rail 3 in front of the upper supply deflection part 11, of which however only the pre-stopping stop bolt 27 is shown.

A transport belt 28, which serves as a device for supplying flat goods 30 to be received in transport bags 29, ends slightly below the supply rail 3 and, in terms of the horizontal level, also slightly below the discharge rail 4. Such transport bags 29 consist of an intrinsically stable carrier wall 31 and a bottom side wall 32, with the wall 32 consisting of a flexible material such as a stable fabric or a stable film. The intrinsically stiff carrier wall 31 comprises a carrier frame 33 of which only an upper carrier body 34 and a lower crossbar 35 are visible. The upper carrier body 34 is provided with a carrier hook 36. The outer ends of the crossbar 35 are provided with couplings which serve as inclination guide stops 37 in the present example of the loading station 1. In the upper carrier body 34, a substantially rectangular hanger 38 is pivotally mounted, with the flexible wall 32 being arranged at the longitudinal side thereof which is spaced from the upper carrier body 34. The hanger 38 comprises lateral opening guide protrusions 39 on the transverse sides by means of which the walls 31, 32 are spaced from each other. In terms of design and function of the carrier bag 29, reference is made to DE 10 2008 026 720 A which includes a detailed description thereof.

As already mentioned, a loading position 41 of the loading station 1 is located in front of a discharge end 40 of the transport belt 28 in the form of a roller conveyor and below the lower discharge deflection part 12. A frame 42 which also carries the discharge end 40 and the vertical conveyor 9 is provided with two upper opening guide rails 43 of which only one is shown and along which in each case one opening guide protrusion 39 of the hanger 38 is guided. Furthermore, two lower inclination guide rails 44 are provided as well of which only one is shown and along which in each case one inclination guide stop 37 of the transport bags 29 is guided.

The functioning of the loading station 1 is as follows:

In the upper supply rail 3, a number of retaining members 5 are provided which are arranged in succession and which are held in position in front of the upper supply deflection part 11 by the pre-stopping stop bolt 27. A transport bag 29 is suspended from each of the retaining members 5, with the carrier hook 36 of the respective bag 29 being inserted into the respective retaining part 7. If one of the transport bags 29 is to be loaded with a piece of flat goods 30, then the pre-stopping stop bolt 27 is retracted quickly, allowing a retaining member 5 with a carrier bag 29 to slide down to the stop bolt 23 of the supply stopping device 21. If the transport bag 29 is to be loaded, then the stop bolt 23 is retracted by correspondingly actuating the piston cylinder drive 22 of the supply stopping device 21, allowing the retaining member 5 with the transport bag 29 to enter the vertical transport rail 10 of the vertical conveyor 8 under the influence of gravity where it comes to rest against a entrainer bolt 20 of the transport chain 13 and is moved downwards at the speed of the transport chain 13.

In the lower discharge deflection part 12, the retaining member 5 is disengaged from the transport chain 13 and comes to rest against the stop bolt 26 of the loading stopping device 24. During the final sliding stage, just before, the transport bag has reached the described position at the stop bolt 26, an opening guide protrusion 39 of the hanger 38 slides along the upper opening guide rail 43, which is inclined relative to the transport direction 8, under the influence of gravity which causes the hanger 38 to be pivoted in such a way that the two walls 31, 32 are spaced from each other. The hanger 38 thus forms an insertion opening 45 which is open towards the discharge end 40. Due to the fact that the lower inclination guide stops 37 slide along the lower inclined inclination guide rails 37, the carrier wall 31 is inclined relative to the vertical both in the downward and in the transport direction 8, causing the bottom side wall 32 to move away from the carrier wall 31 under the influence of gravity and due to the mentioned opening of the hanger 38, with the result that the two walls 31, 32 are spaced from each other. The entire transport bag 29 is thus open.

The transport bags 29 do not necessarily have to be inclined for each time of use. In such a case, the stops 37 and the rails 44 can be dispensed with.

If a piece of flat goods 30 has been discharged into the open transport bag 29, the stop bolt 26 is retracted by correspondingly actuating the piston cylinder drive 25, causing the retaining member 5, together with the loaded transport bag 29, to slide onto the discharge rail 4 under the influence of gravity and to be transported away under the influence of gravity. The next transport bag 29 can then be supplied in the same way.

What is claimed is:

1. A loading station (1) for transport bags (29) transported in an overhead conveyor system (2), comprising
    an upper supply rail (3) for the transport bags (29);
    a vertical conveyor (9) which adjoins the upper supply rail (3) to supply the transport bags (29) to a lower loading position (41);
    an opening device for opening the transport bags (29) in the lower loading position (41); and
    a lower discharge rail (4) which adjoins the vertical conveyor (9) for moving the transport bags (29) away from the lower loading position (41) in a transport direction (8).

2. A loading station according to claim 1, wherein the upper supply rail (3) is connected with the vertical conveyor (9) by means of a supply deflection part (11).

3. A loading station according to claim 1, wherein the vertical conveyor (9) is connected with the lower discharge rail (4) by means of a discharge deflection part (12).

4. A loading station (1) according to claim 1, wherein seen in the transport direction (8) behind the transport rail (13), a loading stopping device (24) is provided at a transition between the vertical conveyor (9) and the discharge rail (4).

5. A loading station (1) according to claim 1, wherein in the lower loading position (41), at least one opening guide rail (43) is provided for opening the transport bags (29).

6. A loading station (1) according to claim 1, wherein the loading station (1) is provided with at least one inclination guide rail (44) for inclining the transport bags (29).

7. A loading station (1) according to claim 1, wherein a transport device (28) for flat goods (30) leads into the lower loading position (41).

8. A loading station (1) for transport bags (29) transported in an overhead conveyor system (2), comprising
    an upper supply rail (3) for the transport bags (29);
    a vertical conveyor (9) which adjoins the upper supply rail (3) for supplying the transport bags (29) in a lower loading position (41);
    an opening device for opening the transport bags (29) in the lower loading position (41); and
    a lower discharge rail (4) which adjoins the vertical conveyor (9) for moving the transport bags (29) away from the lower loading position (41) in a transport direction (8),
    wherein the vertical conveyor (9) comprises a vertical transport rail (10) and a drivable transport chain (13) which is provided with entrainers (20) for holding the transport bags (29) and which has a transport strand (14) which is movable downwards and is being arranged in the vertical transport rail (10).

9. A loading station (1) according to claim 8, wherein in front of the drivable transport chain (13), a supply stopping device (21) is provided at a transition between the upper supply rail (3) and the vertical conveyor (9).

10. A loading station according to claim 8, wherein the upper supply rail (3) is connected with the vertical conveyor (9) by means of a supply deflection part (11).

11. A loading station according to claim 8, wherein the vertical conveyor (9) is connected with the lower discharge rail (4) by means of a discharge deflection part (12).

12. A loading station (1) according to claim 11, wherein in front of the drivable transport chain (13), a supply stopping device (21) is provided at a transition between the upper supply rail (3) and the vertical conveyor (9).

13. A loading station (1) according to claim 8, wherein seen in the transport direction (8) behind the transport rail (13), a loading stopping device (24) is provided at a transition between the vertical conveyor (9) and the discharge rail (4).

14. A loading station (1) according to claim 8, wherein in the lower loading position (41), at least one opening guide rail (43) is provided for opening the transport bags (29).

15. A loading station (1) according to claim 8, wherein the loading station (1) is provided with at least one inclination guide rail (44) for inclining the transport bags (29).

16. A loading station (1) according to claim 8, wherein a transport device (28) for flat goods (30) leads into the lower loading position (41).

\* \* \* \* \*